United States Patent [19]
Schweinberger

[11] Patent Number: 6,129,035
[45] Date of Patent: Oct. 10, 2000

[54] VISUAL CAR SPOTTER

[76] Inventor: Dale Schweinberger, 2352 Rock Crest Glen, Escondido, Calif. 92026

[21] Appl. No.: 09/314,828

[22] Filed: May 19, 1999

[51] Int. Cl.[7] ............................... G09F 17/00; B60Q 1/26
[52] U.S. Cl. ..................... 116/28 R; 116/173; 116/209; 40/592
[58] Field of Search .................. 116/28 R, 173, 116/209, 63 P; 40/592, 591; 340/468, 471, 473, 472, 815.73; 362/493, 496, 501, 503, 487, 504, 505, 506

[56] References Cited

U.S. PATENT DOCUMENTS

| | | | |
|---|---|---|---|
| 1,637,528 | 8/1927 | Liebrich | 362/396 |
| 2,420,772 | 5/1947 | Dalton | 116/28 R |
| 2,783,367 | 2/1957 | Locke | 362/540 |
| 2,812,423 | 11/1957 | Penna | 116/28 R |
| 2,938,110 | 5/1960 | Busch et al. | 40/592 |
| 3,114,129 | 12/1963 | Gilbert | 116/173 |
| 3,487,360 | 12/1969 | Thompson | 40/592 |
| 4,313,264 | 2/1982 | Miller, Sr. | 116/28 R |
| 4,650,147 | 3/1987 | Griffin | 116/28 R |
| 5,385,161 | 1/1995 | Locker et al. | 248/537 |
| 5,388,546 | 2/1995 | Lombard | 116/28 R |

*Primary Examiner*—Andrew H. Hirshfeld
*Attorney, Agent, or Firm*—Frank D. Gilliam

[57] ABSTRACT

A visual car spotter that is visible for a distance either day or night. The visual car spotter includes a telescopic mast with three telescopic segments frusto in cross section constructed of translucent or transparent material which when extended frictionally lock one within another. The mast is removably attached to a base which either has a permanent magnet embedded therein or has a layer of plastic with magnetic particles embedded therein adjacent to the bottom of the base for attachment to the metal roof of the automobile. In one embodiment a light at the distal end of the extended mast is a visual indicator at night and in another embodiment the light is in the base and the entire mast has illumination. A lanyard attached to the base or mast or both extending into the interior of the automobile between the door and door frame prevents theft and provides notice to the driver of the automobile to remove the visual car spotter from the roof.

10 Claims, 1 Drawing Sheet

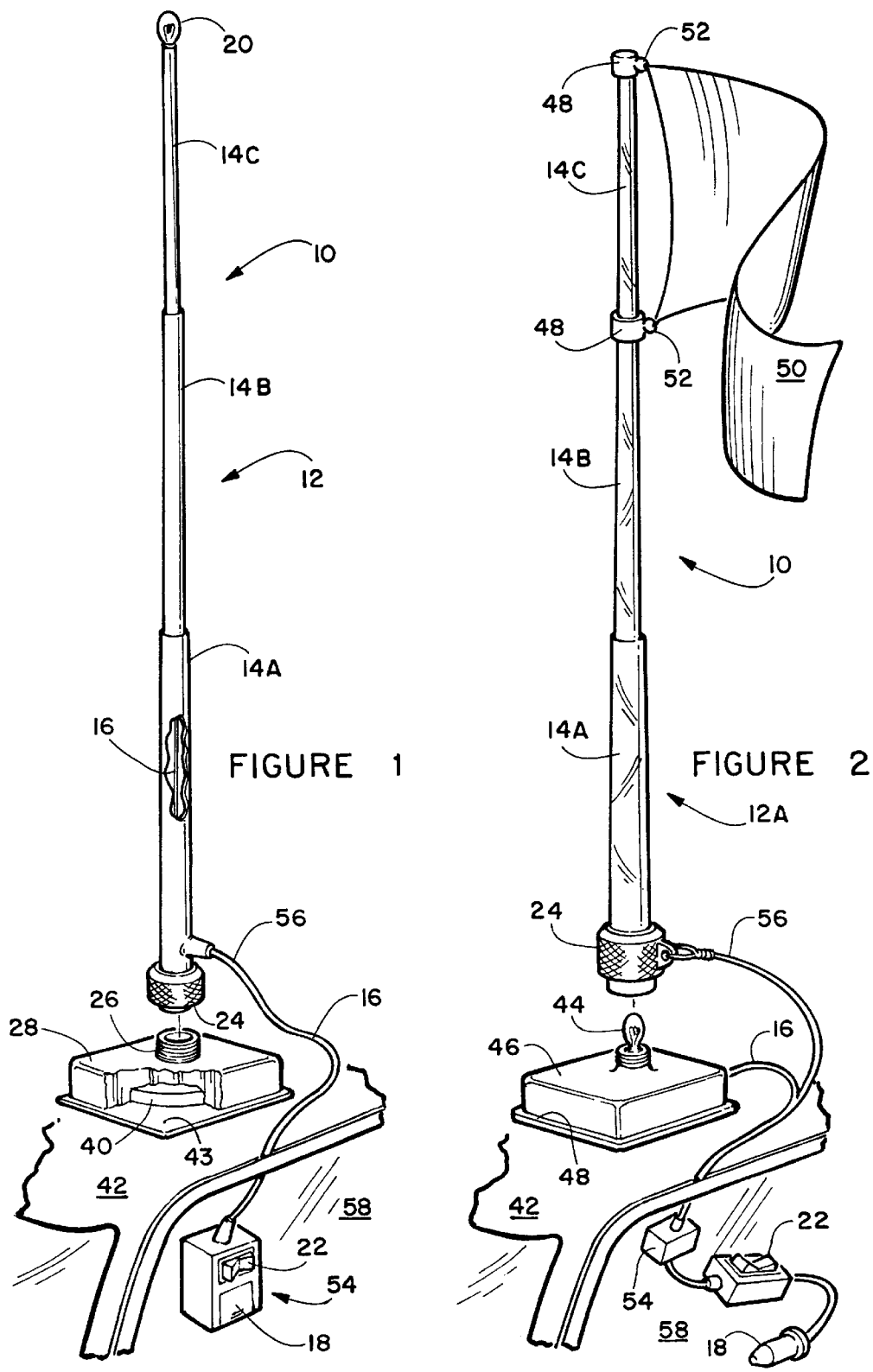

VISUAL CAR SPOTTER

The invention is directed to a temporary visual indicator for locating ones car in a car crowed area of many cars some of which are identical.

Numerous temporary identification devices have provided in the prior art that are adapted for use in easily identifying autos in a large crowed parking area. For example U.S. Pat. Nos. 4,964,360; 4,624,211; 4,896,623; 4,972,795; 5,140,933; 5,176,099; 5,305,704; and 5,388,546.

U.S. Pat. No. 5,140,933, teaches a car locator that removably attaches to the car frame at the upper portion of the window frame. In a second embodiment, a flap member can be inserted between the upper surface of the door and the door frame and when the door is closed the flap is secured thereby. A housing is formed from plastic and a magnet is embedded therein for securing the housing to the car metal body. A plurality of telescoping panels are provided with indica thereon for easy location of the particular car. In order to be of practical use the telescoping signs must be elevated to their maximum height at all times.

U.S. Pat. No. 5,388,546 teaches a roof positioned automobile locator device that includes a magnetic base for attachment to the roof of an auto, a vertical base extension attached to the base, a shaft for insertion into the base extension and a stiff plastic pennant attached to said shaft. The pennant can be colored or have indicia thereon. The pennant is fixed in a selected directional orientation The patent further includes a flexible cord with an enlargement on one end for preventing unauthorized removal when inserted between the door and frame and the door is secured with the enlargement positioned within the auto interior.

The device of the 5,140,933 patent is quite bulky and is suspectable to being dislodged from the auto under high wind conditions and with use with relatively small cars, compact cars, the elevation would not be sufficient to visually identify the auto when parked next to a tall station wagon, sport utility vehicle (SUV) or the like.

There is a continuous need for an improvement in visible indicators for locating specific automobiles in a large parking area in either day light or darkness.

SUMMARY OF THE INVENTION

This invention is directed to an improved visual indicator device for temporary attachment to the roof of an automobile for quick visual indication in a large crowded parking area.

The invention comprises a telescopic pole or shaft that can have any number of tubular telescoping elements depending on the type of automobile for which it is to be used. For small low automobiles, three telescoping elements can be employed. For intermediate size automobiles one of two telescoping elements may be required.

Positioned on each of the upper two telescoping elements at their vertical distal ends is a ring for attaching a visual indicator such as a pliable flag or the like to the telescoping elements. The rings are positioned so that the telescoping of one element into the other is not interfered with.

The lower distal end of the telescoping elements is removably connected to a base member. The base member is formed of a non ferrous esthetic material such as colored plastic or the like. In one embodiment the base member includes a permanent magnet is embedded therein for attaching the base member and telescoping elements to the roof of an automobile or the like. In this embodiment a layer of soft material is attached to the automobile roof attachment surface of the housing to prevent scratching the attached surface.

In another embodiment, the base member is constructed of plastic or the like with a soft plastic sheet with magnetic material formed therein for magnetic attachment to the automobile roof surface. The soft plastic sheet with the magnetic material formed therein is soft enough not to scratch applied surfaces.

A lanyard connected to either the lower element of the mast or to the knurled mast to base connector nut for use as a thief prevention measure when the lanyard is positioned between a door and the upper door frame and the door is closed thereon. The lanyard hanging in the inside of the automobile also reminds the operator to remove the base and telescopic elements from the roof before driving away.

Also in this embodiment, a power cord connected to a power source at one end, as for example, to the cigarette lighter plug, a convenient self contained power supply or the like, through a hollow lanyard and through the center of the tubular telescopic elements for providing power from the power source to a lamp positioned at the distal elevated end of the telescopic elements. A switch can be employed to selectively control the power to the lamp or the power source can be disconnected when not in use.

In a second embodiment, the telescopic elements are formed of a translucent material, such as fiberglass, Lucite, clear or frosted plastic or the like suitable for the purpose intended. In this embodiment the light is positioned in the base and the illumination can be seen along the entire length of the telescoping elements.

White or colored lamps can be used in either the first or second embodiment. Depending on the users choice.

In one embodiments a knurled nut at the lower distal end of the mast threadedly engages mating threads formed by a protrusion on the upper surface of the base. In the second embodiment a similar knurled nut and base protrusion provides the same function and the nut additionally excludes a eye attachment for the lanyard that secures the device to the automobile when the cable is passed between a door frame and a door. In both embodiments the knurled nut rotates relative to the mast.

The principal object of this invention is to provide a visual indicator for location of an automobile in a densely crowded parking area either in day light or night.

Another object of this invention is to provide a pliable pennant or flag for removable attachment to the telescopic elements with one or more telescopic elements extended to its full length.

Yet another object of this invention is to provide a visual means for location of an automobile at night.

To the accomplishments of the above and related objects, this invention may be embodied in the form illustrated in the accompanying drawings, attention being called to the fact, however, that the drawings are illustrative only, and the changes may be in the specific construction illustrated and described within the scope of the appended claims.

BRIEF DESCRIPTION OF THE DRAWING FIGURES

FIG. 1 depicts a first embodiment of a telescopic mast of the invention and

FIG. 2 depicts a second embodiment of the telescopic mast of the invention.

DETAILED DESCRIPTION OF THE INVENTION

In a first embodiment as shown in drawing FIG. 1, the automobile locator 10 comprises a telescopic mast 12 having three tubular telescopic elements 14A, 14B and 14C. The center of the telescopic elements are hollow and may include a two wire power cord 16 which extends from a power source 18, as for example and not by way of limitation, a battery pack, cigarette lighter socket or the like, to a electric light 20 at the distal tip of the telescopic element 14C. A suitable switch 22 selectively operates the light 20 on or off. A knurled nut 24 is positioned over the lower distal end of telescopic element 14A and is rotatable relative to the element 14A for engaging threads 26 in the base 28 for securing the mast to the base. Although threads are shown as a typical connection it should be understood that any convenient connection can be utilized, as for example and not by way of limitation, bayonet, friction connections or the like can be utilized. The telescopic elements 14A, 14B and 14C are slightly tapered toward their substantially maximum extended position elevated end as shown in a slightly frusto conic configuration, so that when they are in their relative position shown in drawing FIGS. 1 or 2 they bind one to the other so the mast remains extended until manually collapsed, not shown.

The base 28 has a non metallic housing, ideally of plastic or the like, that houses a permanent magnet 40 which will magnetically attach to the metal roof of an automobile 42. To prevent scratching of the automobile finish, a soft pad 43 on the automobile contacting surface of the housing is utilized. The pad can be cloth, such as felt, soft plastic or the like suitable for the purpose intended.

Drawing FIG. 2 depicts a second embodiment of the invention. This embodiment comprises a similar telescopic mast 1 2A that takes the same physical configuration as the telescopic mast 12 depicted in drawing FIG. 1. In this embodiment, the telescopic elements 14A, 14B and 14C are constructed of a translucent or clear material, such as the fibreglass as hereinbefore noted or a translucent or clear material such as, for example, LUCITE, clear plastic or the like that allows the inside of the telescopic elements to illuminate along their vertical length from a beam of light from light bulb 44 positioned in the base 46 that can be illuminated from power source 18 and switch 22 as previously discussed.

The base 46 can be constructed from similar plastic material or the like as is base 28. The base 46 does not include a permanent magnet as the embodiment in drawing FIG. 1, but includes, in place thereof soft plastic material 48 with magnetic particles embedded therein, commercially available, from a hardware store, sign store or with sufficient magnetic force suitable for the intended use in place of material 43 of drawing FIG. 1.

Each of the two embodiments include a pair of connector rings 48. One ring 48 is attached to the top vertical end of the two outer most positioned telescopic elements 14 A and 14 B. These connector rings 48 allow a visual indicator 50, see drawing FIG. 2, to be attached to the top distal end of the telescopic mast 12A.

A typical visual indicator 50 can be a pennant or the like constructed of a pliable material so that it will move with the wind to provide visual attraction. The visual indicator 50 can be brightly colored and/or have indicia thereon. The tabs 52 can be hooks, strings for tying or the like or any suitable material to removably attach the visual indicator to the telescopic mast.

An enlarged object 54 is fixedly attached to a lanyard 56 which is fixedly attached to either the mast 12, 12A or the knurled nut 24. When the lanyard 56 is placed between the automobile door 58 and door frame and extends within the interior of the automobile and the door is closed the enlarged object 54 prevents the automobile locator 10 from an unauthorized removal and also reminds the driver of the automobile that the automobile locator is still on the roof.

It should be understood by those skilled in the art that obvious structural modifications can be made without departing from the spirit of the invention. Accordingly, reference should be made primarily to the accompanying claims, rather than the foregoing specifications, to determine the scope of the invention.

Having thus described the invention, what is claimed is:

1. A visual automobile locator, for use with an automobile having an interior, a roof top, a door, and a door frame, said visual locator comprising:

a telescopic mast having two or more frusto conic telescoping segments, said segments frictionally locking one within another at their extreme extended length;

a base member having a top and top surface, said bottom surface removably attached to a proximal end of said telescopic mast, said bottom surface of said base member being magnetically attachable to said roof top; and a lanyard having a proximal end branching into a first portion and a second portion, said first portion extending into said base member, and said second portion connected to said mast and being entirely external to said base member, said lanyard having an enlarged distal end portion which prevents theft of said visual automobile locator from said automobile when said base member is attached to said roof top and said enlarged distal end portion is extended into the interior of said automobile.

2. The visual automotive locator as defined in claim 1 further comprising a removable attachment cap at the tip of the distal end of the most elevated one of said telescopic segments and a ring around the most elevated segment for removable attaching a pennant to said telescopic mast.

3. The visual automotive locator as defined in claim 1 wherein said attachment of said base to said roof top is a permanent magnet positioned within said base member.

4. The visual automotive locator as defined in claim 1 wherein the bottom surface of said base member has a soft plastic sheet with magnetic properties embedded therein fixedly attached thereto.

5. The visual automotive locator as defined in claim 1 wherein said telescopic segments are translucent.

6. The visual automotive locator as defined in claim 5 wherein said translucent telescopic segments are fiberglass.

7. The visual automotive locator as defined in claim 5 wherein said telescopic segments are selectively illuminated.

8. The visual automotive locator as defined in claim 1 wherein said telescopic segments are transparent plastic.

9. The visual automotive locator as defined in claim 8 wherein said transparent plastic is LUCITE.

10. The visual automotive locator as defined in claim 1 wherein the proximal end of said telescopic mast has a light therein.

* * * * *